United States Patent [19]

Ishikawa et al.

[11] 4,121,482
[45] Oct. 24, 1978

[54] W-N GEAR HAVING A MAXIMUM SURFACE STRENGTH

[75] Inventors: Shoichi Ishikawa, Yokohama; Kiyoshi Kotake, Tokyo; Seishi Honma, Kawasaki, all of Japan

[73] Assignee: Kabushiki Kaisha Hasegawa Haguruma, Tokyo, Japan

[21] Appl. No.: 823,467

[22] Filed: Aug. 10, 1977

[30] Foreign Application Priority Data

Aug. 24, 1976 [JP] Japan .................................. 51-100203

[51] Int. Cl.$^2$ ............................................. F16H 55/06
[52] U.S. Cl. ..................................................... 74/462
[58] Field of Search .................................. 74/457, 462

[56] References Cited

U.S. PATENT DOCUMENTS

| 3,855,874 | 12/1974 | Honma et al. | 74/462 |
| 4,051,745 | 10/1977 | Ishikawa | 74/462 |

Primary Examiner—Leonard H. Gerin
Attorney, Agent, or Firm—Oldham, Oldham, Hudak & Weber Co.

[57] ABSTRACT

A W-N gear which has a surface strength at least nearly maximized for a given addendum and minimum pressure angle is realized by selecting a mean radius for the convex and concave circular arcs of the tooth profile in an appropriate range. Also, a dual=line mesh W-N gear of the character described which has a requisite face width minimized is obtained by selecting a mean arc radius which lies in the range referred to above and enables the addendum and dedendum points of meshing contact to appear at equal angle intervals.

2 Claims, 4 Drawing Figures

W-N GEAR HAVING A MAXIMUM SURFACE STRENGTH

BACKGROUND OF THE INVENTION

W-N (Wildhaber-Novikov) gears, of the tooth profile including circular arcs centered on the pitch circle or in the neighborhood thereof, are principally intended for transmission of rotation through the medium of the helical tooth surfaces and, as is well known in the art, excel conventional involute gears in surface strength.

With such gears, it is naturally expected that the surface strength varies with the length of radius of the curcular arcs of the tooth profile and this has already been pointed out in literature. For example, in a U.S.S.R. research report, it is stated that the radius of circular arcs should preferably be larger than half the normal circular pitch.

The inventors, now taking notice of the fact that the surface strength of W-N gear teeth depends not only upon the arc radius but also upon such parameters as the tooth height and the minimum pressure angle on the arcuate regions of the tooth profile, have found that for any fixed tooth height and minimum pressure angle there exists in a practicable range an arc radius which maximizes the surface strength.

SUMMARY OF THE INVENTION

Accordingly, the present invention is designed to realize a W-N gear having a maximum surface strength upon the principle described and has for its primary object the provision of a W-N gear which is improved over any previous form of W-N gear in surface load-bearing capacity, with the surface strength maximized or nearly maximized for the tooth height and minimum pressure angle given.

Another object of the present invention, based upon the fact that W-N gears are essentially helical gears and must have a definite face width for continuous rotational movement, is to provide a dual-line mesh W-N gear which requires only a minimum face width while having a surface strength maximized or nearly maximized in accordance with the first object of the invention described above.

The principles of the present invention and a few preferred embodiments thereof will next be described with reference to the accompanying drawings.

DESCRIPTION OF THE PREFERRED EMBODIMENTS

At the first, description will be made of a W-N gear which has a maximum surface strength according to the first aspect of the present invention.

Generally, meshing engagement between W-N gears occurs between the convex and concave circular arcs of the tooth profile and it is highly desirable from the viewpoint of tooth strength that the two circular arcs have the same length of radius to come smoothly into close contact with each other. In practice, however, the two circular arc portions are generally formed slightly different from each other in radius so as to make intimate contact with each other only after the gears have been run in properly to cause the tooth surfaces to wear.

Figure 1:
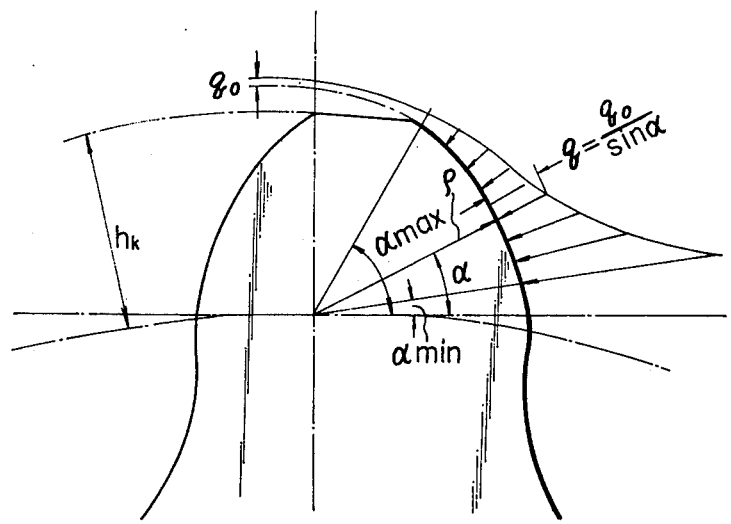
FIG. 1 is a load density diagram on the tooth profile, taken in a normal reference plane, of a W-N gear which is already in a well worn or run-in state.

At this point, the conception of surface strength of W-N gears, disclosed in a U.S.S.R. textbook, "Detali. Mashim", (1970), by V. A. Dmitriev, will be cited below from which the present invention has proceeded. In the textbook, it is supposed that instantaneous contact between W-N gears after the running-in operation is made along the circular arc of the tooth profile taken in a normal reference plane, and, as illustrated in FIG. 1, it is assumed that the load distribution along the line of instantaneous contact be expressed in terms of the linear load density, $q$, as follows:

$$q = q_o / \sin\alpha \tag{1}$$

where $q_o$ represents a fixed value of load density and $\alpha$ represents the normal pressure angle at the point taken on the circular arc for consideration. That this assumption is reasonable is ascertained here as follows.

First, the relative curvature $1/\rho_s$ of the tooth surface taken of the point of pressure angle $\alpha$ in the direction normal to the line of instantaneous contact is approximately given by the formula, $$\frac{1}{\rho_s} = \frac{2 \sin\alpha \sin^2\beta}{d_1} \cdot \frac{i+1}{i} \tag{2}$$

where $\beta$ is the helix angle at the pitch diameter, $d_1$ is the pitch circle diameter of the pinion and $i$ is the gear ratio, i.e., the ratio of (number of teeth of the gear wheel)/(number of teeth of the pinion).

Further, as is well known, the Hertz stress, $\sigma_H$, at the point of contact is related to the load density $q$ and the relative curvature $1/\rho_s$ as follows:

$$\sigma_H \propto \sqrt{q \cdot \frac{1}{\rho_s}} \tag{3}$$

Now, in load tests of W-N gears, if the load applied is increased in excess, pitting takes place to impair the tooth surface. In this case, pits are formed evenly at all points on the circular arc without exhibiting any tendency to crowd close to the tooth top or the pitch line, or independently of the pressure angle $\alpha$. Seeing that the occurrence of pits is basically dependent upon the Hertz stress $\sigma_H$, the above fact that pits are formed evenly at all points on the circular arc is considered to indicate that $\sigma_H$ is the same in value at all points on the circular arc and hence $q \cdot (1/\rho_s)$ has a definite value independently of $\alpha$. From this and a further fact that $1/\rho_s$ is a function of $\sin\alpha$, as observed from the formula (2), it is found that $q$ is a function of $1/\sin\alpha$, indicating that the assumption of the formula (1) for load density is quite reasonable.

Next, the torque M transmitted by the W-N gear of FIG. 1 under such load density $q$ is given as follows:

$$M = \int_{\alpha_{min}}^{\alpha_{max}} \frac{d}{2} \cdot \frac{q_o}{\sin\alpha} \cdot \cos\alpha \cdot \cos\beta \cdot \rho d\alpha \qquad (4)$$

$$= \frac{1}{2} q_o \cdot d \cdot \cos\beta \cdot \rho \cdot \ln\frac{\sin\alpha_{max}}{\sin\alpha_{min}}$$

where $d$ is the pitch circle diameter, $\beta$ the helix angle at the pitch diameter, $\rho$ the arc radius, $\alpha_{max}$ and $\alpha_{min}$ the maximum and minimum pressure angles, respectively, of the contacting circular flank arc.

Though $\alpha_{max}$ and $\alpha_{min}$ vary with the numbers of teeth of meshing gears, they may safely be assumed to have the following values:

$$\sin\alpha_{max} = \frac{h_k}{\rho} \qquad (5)$$

$$\alpha_{min} = \gamma$$

since tooth profiles can be compared with each other to performance principally upon the basis of their basic rack form. In (5), $h_k$ represents the addendum and $\gamma$ the pressure angle at that end of the circular arc which is adjacent to the pitch line. With ordinary dual-line mesh W-N gears, of the basic rack profile including convex and concave circular arcs interconnected by a straight line segment, $\gamma$ corresponds to the pressure angle along the straight line segment.

Proceeding further from the above considerations, made upon the basis of the formulation disclosed in the above-cited V. A. Dmitriev's textbook, the inventors have found, from the formula, $$M = \frac{1}{2} q_o \cdot d \cdot \cos\beta \cdot \rho \ln\frac{h_k}{\rho\sin\gamma} \qquad (6)$$

which is obtained by substituting the values (5) in the formula (4), that the torque transmitted by the W-N gear can be regarded as a function only of the radius of the circular flank arc, $\rho$, when $q_o$, $d$, $\beta$, $h_k$ and $\gamma$ are given. Further, it has been found that the value of $\rho$ which gives the maximum value of M can be obtained in the following manner. (Such $\rho$ value will be referred to hereinafter as $\rho_{opt}$.) Namely, based upon the formula (6), an equation $$\frac{dM}{d\rho} = q_o \cdot d \cdot \cos\beta \left(\ln\frac{h_k}{\rho\sin\gamma} - 1\right) = 0$$

is posed and hence the formula $$\rho = \rho_{opt} = \frac{h_k}{e \cdot \sin\gamma} \qquad (7)$$

is obtained, where $e$ denotes the Napierian log base. Further, it is found that $$\frac{dM^2}{d\rho 2} = -\frac{1}{2} q_o d \cdot \cos\beta \cdot \frac{1}{\rho} < 0$$

and this indicates that the $\rho$ given by the formula (5) no doubt gives a maximum value of M.

Where parameters such as pitch circle diameter d, gear ratio $i$ and helix angle $\beta$ are given, the ratio of proportion $_0$ of the formula (1) is determined for any given value of Hertz stress $\sigma_H$ by the formulas (1), (2) and (3). Under this condition, it is observed from the formula (6) that the larger the value of $$\rho\ln\frac{h_k}{\rho\sin\gamma}$$

is, the greater the transmission torque obtainable upon the basis of the surface strength is. In other words, $$\rho\ln\frac{h_k}{\rho\sin\gamma}$$

can be empolyed as a criterion for judging the appropriateness of the tooth profile. Now, let Z represent $$\frac{\rho}{m_n} \times \ln\frac{h_k}{\rho\sin\gamma},$$

in which $h_k$ and $\gamma$ are basic parameters to be given in advance to define the tooth profile. Then, it will be recognized thta, if the matter in hand is reduced to the judgment of performance of the tooth profile under the given conditions of $h_k$ and $\gamma$, the magnitude of Z is basically determined by the arc radius $\rho$ and the formula (7) given above serves as a most appropriate answer to the problem concerned.

Further, the maximum value of Z conrresponding to the arc radius $\rho_{opt}$ of formula (7) is readily determined as $$Z_{max} = \frac{\rho_{opt}}{m_n} \qquad (8)$$

Figure 2:
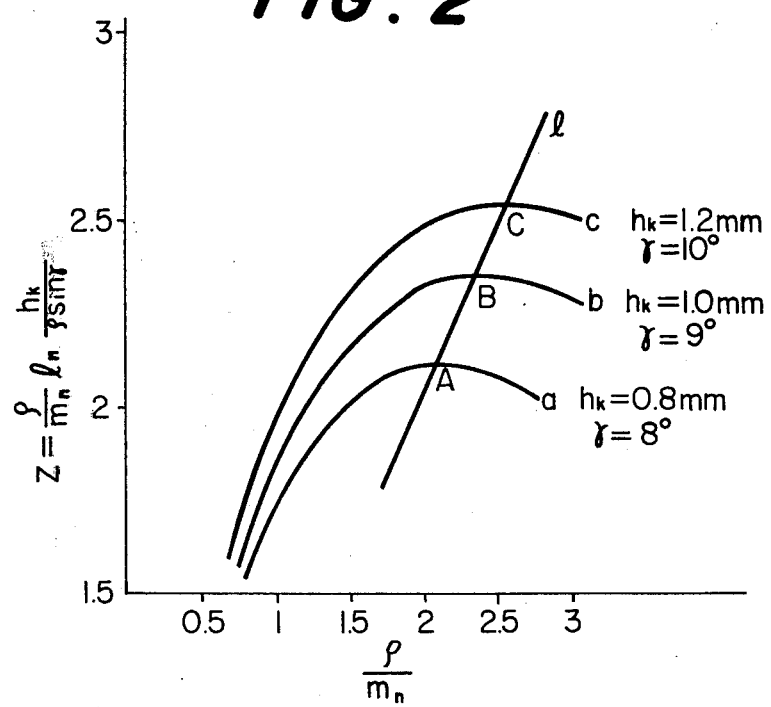
FIG. 2 graphically illustrates the relationship between the radius of circular arc of the standard tooth profile of W-N gears and the surface strength thereof, which forms the basis upon which the arc radius is selected in the present invention.

FIG. 2 illustrates the relationship between the criterion number $$Z = \frac{\rho}{m_n} \times \ln\frac{h_k}{\rho\sin\gamma}$$

and the length of arc radius per unit module, $\rho/m_n$, for different sets of values of addendum $h_k$ and minimum pressure angle $\gamma$. As observed from this illustration, the transmission torque M can be increased for any given Hertz stress $\sigma_H$ as Z increases. As indicated, curved line $a$ corresponds to the tooth profile of $h_k = 0.8\ m_n$ and $\gamma = 8°$, $b$, to that of $h_k = 1.0\ m_n$ and $\gamma = 9$; and $c$ to that of $h_k = 1.2\ m_n$ and $\gamma = 10°$. Points A, B and C on the respective curved lines are each a point where a maximum surface strength is obtained. As shown, these points lie on a straight line $l$ which, corresponding to the formula (8), includes points where the values of $\rho/m_n$ and Z are equal to each other.

Accordingly, the present invention takes the position that the surface strength of a W-N gear can be maximized or nearly maximized for any given combination of the addendum and the minimum pressure angle by employing a profile arc radius selected on the straight line $l$ or in the neighborhood thereof.

Figure 3:
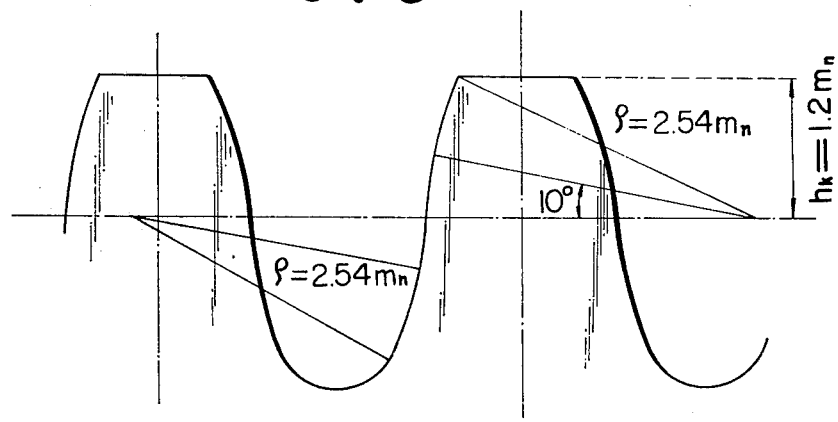
FIG. 3 is a basic rack diagram of one example of dual-line mesh W-N gear embodying the present invention and having a basic rack profile corresponding to the point C in FIG. 2.

FIG. 3 illustrates the basic rack form of a dual-line mesh W-N gear which corresponds to the point C in FIG. 2. In fact when $h_k = 1.2\ m_n$ and $\gamma = 10°$, the arc radius for maximum torque, $\rho_{opt}$, is given by the formula (7) as follows:

$$\rho_{opt} = \frac{1.2 \, m_n}{e \sin 10°} = 2.54 \, m_n$$

and hence, by the formula (8)

$$Z_{max} = 2.54$$

It is to be noted that the tooth profile of FIG. 3 represents that of the basic rack form of a W-N gear as obtained after the running-in operation and having tooth surfaces well worn to make smooth contacting engagement. Further, the basic tooth profile actually formed by a gear-cutting tool generally has convex and concave circular arcs differing in radius from each other. Therefore, the arc radius given by the formula (7) corresponds to that of the tooth profile obtainable after the running-in operation or to the mean arc radius to which the different arc radii initially given to the gear converge as the tooth surfaces are worn down. Incidentally, the percentage difference in length of radius between the two circular arcs of the basic tooth profile as set on a gear-cutting tool is usually 15% or less.

The occurrence of pitting in the tooth surface is a rather complicated phenomenon and its analysis unavoidably includes more or less variations. Further, as observed in FIG. 2, change in value of Z in the neighborhood of its maximum is moderate compared with that of $\rho$ and the extent of reduction below the maximum value of Z and hence of surface strength is at most about 3% or less. It will be noted, therefore, that, in order to form tooth surfaces which exhibit a maximum or nearly maximum surface strength after the running-in operation, the radii to be set on the gear-cutting tool for the two circular arcs of the tooth profile only need to be selected in a range which satisfies the following formula, $$0.8 \times \frac{h_k}{e \sin\gamma} \leq \rho \leq 1.2 \times \frac{h_k}{e \sin\gamma} \quad (9)$$

Though description has been made in the above of the tooth profile of W-N gears taken in a normal reference plane, it will be apparent that the same principles are also applicable to the tooth profile taken in a transverse reference plane and that their applicability is not limited to W-N gears of the dual-line mesh type nor to those of the single-line mesh type.

Having described W-N gears which have a surface strength maximized or nearly maximized according to the first aspect of the present invention, description will next be made in detail of a dual-line mesh W-N gear which is not only of the character described but has a requisite face width reduced to a minimum according to the second aspect of the present invention.

As is well known, W-N gears are essentially helical gears which transmit rotation progressively along the tooth trace and must have at least a minimum of face width in order to transmit rotation in a continuous fashion. A requisite face width as referred to in this specification represents such minimum face width.

Now, a pair of W-N gears can transmit rotation in a continuous fashion provided that there exists at all times at least one point of contact therebetween. With the case of a single-line mesh W-N gear, therefore, the requisite face width is equal to the axial tooth pitch $t_a$ of the gear. On the other hand, with the case of a dual-line mesh W-N gear, points of contact appear on both of its addendum and dedendum surfaces and this makes it possible to make the requisite face width shorter than the axial tooth pitch $t_a$.

In the latter case, it will be noted that the requisite face width depends upon the axial distance between the addendum and dedendum points of contact appearing simultaneously on a single or plural tooth surfaces. In other words, if these points of contact appear alternately on the tooth surfaces successively at equal axial intervals as the gears rotate, the ratio of the requisite face width to the axial pitch will have a minimum value of 0.5 and the requisite face width will increase as the distance between the two points of contact on a single tooth surface deviates from the state described above.

It will thus be noted that the axial distance between the points of contact appearing successively on a single or plural tooth surfaces as the gears rotate can be safely discussed upon the basis of the axial distance of the points of contact appearing on the surface of a single tooth. The face width as determined in this manner will be referred to hereinafter as a basic face width.

Figure 4:
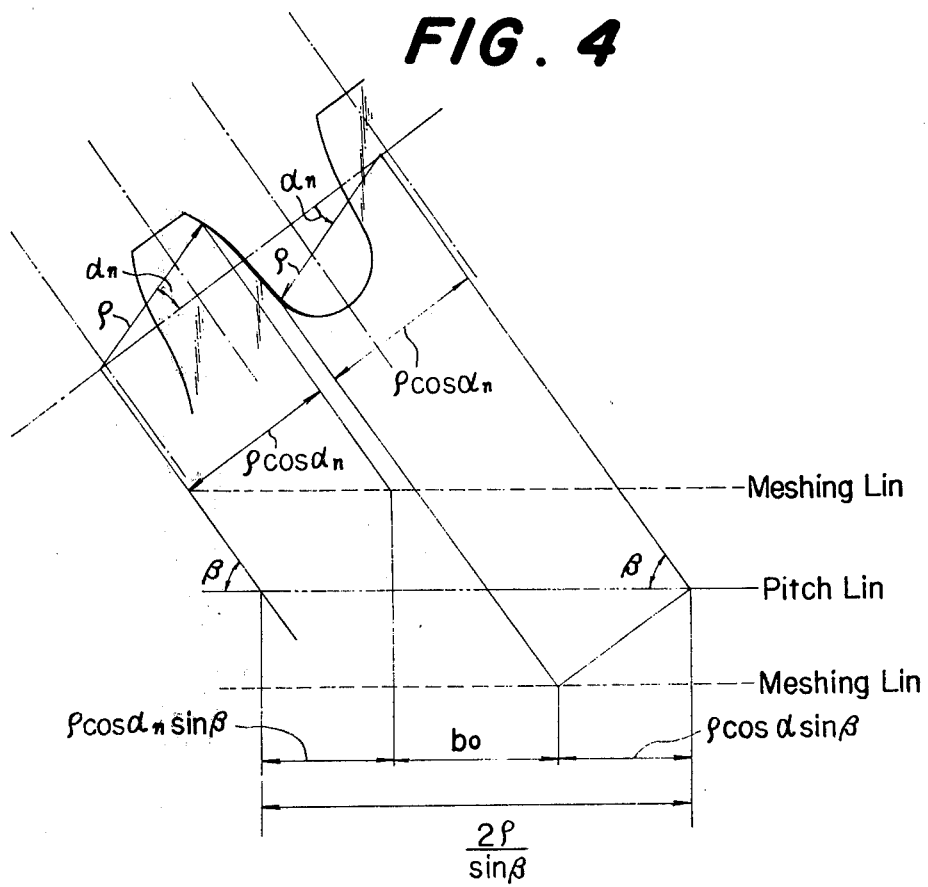
FIG. 4 diagrammatically illustrates the basic face width, $b_0$, of a dual-line mesh W-N gear, that is, the axial distance between the points of contact appearing on the addendum and dedendum surfaces of a single tooth flank of the W-N gear.

Now, for convenience of the hobbing operation, widely employed in the production of gears of the kind described, the basic tooth profile is taken in a normal reference plane. Then, the basic face width $b_0$ is given approximately by the following formula (see FIG. 4), $$b_o = \frac{2\rho}{\sin\beta} (1 - \cos\alpha_n \sin^2\beta)$$

where $\rho$ represents the arc radius of the tooth profile in a run-in state, which is approximately equal to the mean arc radius of the tooth profile as initially formed; $\alpha_n$ represents the normal pressure angle at the point of contact before the running-in gear operation; and $\beta$ represents the helix angle at the pitch diameter.

Now, as stated above, in order to minimize the requisite face width, the condition that the addendum and dedendum points of contact appear on the tooth surface successively at equal axial intervals should be satisfied and, under this condition, the requisite face width is minimized when the basic face width $b_0$ is equal to the axial pitch $t_a$ plus or minus $\frac{1}{2}t_a$, that is $3/2 t_a$ or $\frac{1}{2} t_a$. However, considering the fact that the arc radius which maximizes or nearly maximizes the surface strength as previously described is larger than that conventionally employed, it is noticed that the basic face width $b_0$ should be determined at the value of $3/2 t_a$.

Accordingly, from the formula (10) we obtain $$\frac{2\rho}{\sin\beta} (1 - \cos\alpha_n \sin^2\beta) = \frac{3}{2} t_a$$

and, since $t_a = \pi m_n / \sin\beta$, $$\rho(1 - \cos\alpha_n \sin^2\beta) = \frac{3}{4} \pi m_n \quad (11)$$

Then, assuming an allowance of 20% for the basic face width $b_0$, the following range formula is obtained.

$$0.8 \times \frac{3}{4} \times \frac{\pi m_n}{(1 - \cos\alpha_n \sin^2\beta)} \leq \rho \leq 1.2 \times \frac{3}{4} \times \quad (12)$$

-continued
$$\frac{\pi m_n}{(1 - \cos\alpha_n \sin^2\beta)}$$

This gives a condition to be met in this instance simultaneously with another condition previously given as formula (9), which gives an arc radius for maximizing or nearly maximizing the surface strength.

It will thus be noted that, in oder to realize a dual-line mesh W-N gear having a requisite face width minimized or nearly minimized while at the same time having a surface strength maximized or nearly maximized, it suffices to specify the parameters of the tooth profile, taken in a normal reference plane, so as to satisfy the two formulas (9) and (12).

A few specific examples will next be given based upon the formulas (7) and (11), from which the formulas (9) and (12) have been derived, respectively.

(I) Long-addendum teeth:
Let $h_k = 1.200 \times m_n$ and $\gamma = 10.00°$. Then from formula (7)

$$\rho = 2.542 \times m_n$$

Now, assuming $\beta = 16.15°$, there is obtained from formula (11)

$$\alpha_n = 19.13°$$

In this case, maximum pressure angle $\alpha_{max}$, minimum pressure angle $\alpha_{min}$ (which corresponds to the pressure angle, at the straight line portion of the tooth profile) and their arithmetic mean are clculated respectively as follows:

$$\alpha_{max} = \sin^{-1} \frac{1.200}{2.542} = 28.17°$$

$$\alpha_{min} = \gamma = 10.00$$

$$\frac{\alpha_{max} + \alpha_{min}}{2} = 19.08°$$

Thus, it is noted that the value of $\alpha_n = 19.13°$ obtained above nearly corresponds to the value to be found at the midpoint of the circular flank arc and is quite appropriate.

(II) Standard teeth:
Let $h_k = 1.000 \times m_n$ and $\gamma = 8.50°$. Then $$\rho = 2.489 \times m_n$$

Now assuming $\beta = 13.60°$, there is obtained $$\alpha_n = 15.20°$$

In this case, $\alpha_{max}$, $\alpha_{min}$ and their means value are calculated as follows:

$$\alpha_{max} = \sin^{-1} \frac{1.000}{2.489} = 23.69°$$

$$\alpha_{min} = \gamma = 8.50°$$

$$\frac{\alpha_{max} + \alpha_{min}}{2} = 16.09°$$

It is noted again that the value of pressure angle $\alpha_n$ of the basic tooth profile is appropriate, nearly corresponding to the value to be found at the midpoint of the blank arc.

FIG. 3 illustrates the actual tooth profile in the case (I).

It will be appreciated from the foregoing description that, according to the present invention, there can be realized a W-N gear which has a miximized or nearly maximized surface strength for any given addendum and minimum pressure angle and also a dual-line mesh W-N gear of the character described which has a requisite face width minimized or nearly minimized.

Finally, for better understanding of the present invention, brief description will be made of the bending strength of the teeth of the W-N gear embodying the present invention.

It is generally supposed in the art that the bending strength of W-N gear teeth cannot be properly defined by the beam theory, conventionally employed for ordinary gear teeth, but must be dealt with by the theory of plate bending as the length of instantaneous contact between W-N gear teeth is limited in the direction of tooth trace.

According to the plate theory, the maximum value of bending moment appearing in the critical section at the tooth bottom depends upon the relation between the distance of the point of intersection of the line of load with the medial line of the tooth from the critical section and the tooth height as measured from the critical section and also upon the magnitude of tangential load and has no bearing on the apparent difference in tooth type, long- or short-addendum or full-depth. Namely, the maximum bending strength and the section modulus at the critical section of W-N gear teeth can be held substantially the same independently of the tooth height and the teeth of the W-N gear as illustrated in the embodiment of the present invention are never to be inferior to those of conventional W-N gears in bending strength and are considered comparable thereto. It will thus be recognized that the practicability of the W-N gear of the present invention is not limited to any extent on account of the tooth height.

What is claimed is:

1. A W-N gear having a basic rack tooth profile, taken in a normal or transverse reference plane, which has a mean radius, $\rho$, of inter-meshing convex and concave circular arcs selected in the range $$0.8 \times \frac{h_k}{e \sin\gamma} \leq \rho \leq 1.2 \times \frac{h_k}{e \sin\gamma}$$

where $h_k$ represents the addendum, $\gamma$ the minimum pressure angle and $e$ the Napierian log base, so that the surface strength is at least nearly maximized for the given values of addendum and minimum pressure angle.

2. A dual-line mesh W-N gear having such a basic tooth profile, taken in a normal reference plane, as to satisfy the following two approximation formulas simultaneously, $$0.8 \times \frac{h_k}{e \sin\gamma} \leq \rho \leq 1.2 \times \frac{h_k}{e \sin\gamma}$$

$$0.8 \times \frac{3}{4} \times \frac{\pi m_n}{(1 - \cos\alpha_n \sin^2\beta)} \leq \rho$$

$$\leq 1.2 \times \frac{3}{4} \times \frac{\pi m_n}{(1 - \cos\alpha_n \sin^2\beta)}$$

where $m_n$ represents the normal module, $\alpha_n$ the normal pressure angle at the point of contact on the circular arcs, $h_k$ the addendum, $\gamma$ the minimum pressure angle of the circular arcs, $\beta$ the helix angle at the pitch diameter, $\rho$ the mean radius of the addendum and dedendum circular arcs of the tooth profile and $e$ the Napierian log base.

* * * * *